United States Patent
Maattanen et al.

(10) Patent No.: US 12,231,930 B2
(45) Date of Patent: Feb. 18, 2025

(54) METHODS OF CONFIGURING SSB/PCI FOR USE BY A UE AND RELATED USER EQUIPMENT AND NETWORK NODES

(71) Applicant: TELEFONAKTIEBOLAGET LM ERICSSON (PUBL), Stockholm (SE)

(72) Inventors: Helka-Liina Maattanen, Helsinki (FI); Mattias Frenne, Uppsala (SE); Mats Folke, Vällingby (SE); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 405 days.

(21) Appl. No.: 17/763,036

(22) PCT Filed: Sep. 4, 2020

(86) PCT No.: PCT/IB2020/058271
§ 371 (c)(1),
(2) Date: Mar. 23, 2022

(87) PCT Pub. No.: WO2021/064494
PCT Pub. Date: Apr. 8, 2021

(65) Prior Publication Data
US 2022/0386154 A1    Dec. 1, 2022

Related U.S. Application Data

(60) Provisional application No. 62/909,114, filed on Oct. 1, 2019.

(51) Int. Cl.
*H04W 72/04*    (2023.01)
*H04W 24/08*    (2009.01)
(Continued)

(52) U.S. Cl.
CPC ........... *H04W 24/08* (2013.01); *H04W 48/16* (2013.01); *H04W 52/146* (2013.01); *H04W 36/00698* (2023.05)

(58) Field of Classification Search
CPC ... H04W 24/08; H04W 48/16; H04W 52/146; H04W 36/00698; H04W 36/06; H04W 36/0085; H04W 36/305
See application file for complete search history.

(56) References Cited

U.S. PATENT DOCUMENTS

2019/0379506 A1* 12/2019 Cheng ................... H04W 88/06
2020/0112355 A1*  4/2020 Park ...................... H04L 5/0094
(Continued)

OTHER PUBLICATIONS

Ericsson, "Enhancements to multi-beam operation", 3GPP TSG-RAN WG1 Meeting #102-e, eMeeting, Aug. 17-28, 2020, pp. 1-16, Tdoc R1-2005842, 3GPP.
(Continued)

*Primary Examiner* — Mahbubul Bar Chowdhury

(57) ABSTRACT

According to some embodiments, a method of operating a network node is provided. A first information element IE is provided including an indication of an added synchronization signal block/physical cell identity SSB/PCI. The indication of the added SSB/PCI indicates an SSB and associated PCI that are associated with a radio link. A second IE is provided including the indication of the added SSB/PCI. The second IE relates to at least one of channel state information CSI, radio link monitoring, uplink power control, and/or uplink spatial relations. A control message including the first IE and the second IE is transmitted to a user equipment UE, to enable the UE to perform a radio link monitoring function on the radio link.

19 Claims, 7 Drawing Sheets

(51) Int. Cl.
*H04W 48/16* (2009.01)
*H04W 52/14* (2009.01)
*H04W 36/00* (2009.01)

(56) References Cited

U.S. PATENT DOCUMENTS

| | | | | |
|---|---|---|---|---|
| 2020/0314708 | A1* | 10/2020 | Jassal | H04W 16/28 |
| 2020/0351055 | A1* | 11/2020 | Manolakos | H04L 5/0048 |
| 2020/0351841 | A1* | 11/2020 | Cirik | H04W 48/08 |
| 2021/0050963 | A1* | 2/2021 | Zarifi | H04W 56/001 |
| 2023/0232313 | A1* | 7/2023 | Ji | H04B 7/063 |
| | | | | 370/329 |

OTHER PUBLICATIONS

Ericsson, "Lower-layer mobility enhancements", 3GPP TSG-RAN WG1 Meeting #96, Athens, Greece, Feb. 25-Mar. 1, 2019, pp. 1-8, Tdoc R1-902528, 3GPP.

Ericsson, "On inter-cell operation for mTRP", 3GPP TSG-RAN WG1 Meeting #102, eMeeting, Aug. 17-28, 2020, pp. 1-2, Tdoc R1-2006368, 3GPP.

Huawei et al., "Physical layer aspects for NR mobility enhancements", 3GPP TSG RAN WG1 Meeting #97, Reno, USA, May 13-17, 2019, pp. 1-12, R1-1906056, 3GPP.

Huawei et al., "Views on beam-based mobility in NR", 3GPP TSG RAN WG1 Meeting #97, Reno, USA, May 13-17, 2019, pp. 1-4, R1-1907543, 3GPP.

* cited by examiner

METHODS OF CONFIGURING SSB/PCI FOR USE BY A UE AND RELATED USER EQUIPMENT AND NETWORK NODES

The present application is a 371 of International Application No. PCT/IB2020/058271, filed Sep. 4, 2020, which claims the benefit of and priority to U.S. Provisional Patent Application No. 62/909,114, filed Oct. 1, 2019, entitled "METHODS OF CONFIGURING SSB/PCI FOR USE BY A UE AND RELATED USER EQUIPMENT AND NETWORK NODES," the disclosures of which are hereby incorporated herein by reference in their entirety.

TECHNICAL FIELD

The present disclosure relates generally to communications, and more particularly to communication methods and related devices and nodes supporting wireless communications.

BACKGROUND

The scope of Rel-16 MIMO enhancements stated in RP-182067 (Reference [6]) WID Enhancements on MIMO for NR (September 2018) includes the following objectives for multi-transmit receive point (TRP)/panel transmission including improved reliability and robustness with both ideal and non-ideal backhaul: Specify downlink control signaling enhancement(s) for efficient support of non-coherent joint transmission; Perform study and, if needed, specify enhancements on uplink control signaling and/or reference signal(s) for non-coherent joint transmission; and Include multi-TRP techniques for ultra-reliable low-latency communication (URLLC) requirements.

RAN1 has been working with two variants of this:
1. Single PDCCH mTRP (multi-TRP) where the UE receives PDCCH from one TRP and may receive PDSCH from the same or different TRP.
2. Multiple PDCCH relating to different TRPs and UE receives PDCCH via different TRPs and also PDSCH via more than one TRP.

3GPP RAN1 has sent the following LSs to 3GPP RAN2 on this WI:
Reference [1] R1-1903697 LS on support of Enhancements on multi-TRP/panel transmission
Reference [2] R1-1907966 LS on MIMO enhancement for NR
Reference [3] R1-1907870 LS on MAC CE design for SCell BFR Based on the LSs received, the multiTRP operation may be supported with multiple PDCCHs (same or different cellID) or with one PDCCH (same cell ID). The LS in [1] treats only multi-PDCCH transmission and includes:

For multiple PDCCH based multi-TRP/panel transmission, the total number of code words (CWs) in scheduled PDSCHs, each of which is scheduled by one PDCCH, is up to 2 and also the total number of MIMO layers of scheduled PDSCHs is up to reported UE MIMO capability, if resource allocation of PDSCHs are overlapped.

To support multiple-PDCCH based multi-TRP/panel transmission with intra-cell (same cell ID) and inter-cell (different Cell IDs), RRC configuration can be used to link multiple PDCCH/PDSCH pairs with multiple TRPs. One CORESET in a "PDCCH-config" corresponds to one TRP.

Separate ACK/NACK payload/feedback for received PDSCHs is supported. For separate ACK/NACK payload/feedback for received PDSCHs where multiple DCIs are used, PUCCH resources conveying ACK/NACK feedback can be TDM with separated HARQ-ACK codebook.

The LS in Reference [2] includes RAN1 agreements across the MIMO WI and the multi-TRP related are discussed below.

On multiple PDCCH based multi-TRP/panel transmission, for multi-PDCCH based multi-TRP operation, increase the maximum number of CORESETs per "PDCCH-config" to 5, according to UE capability.

For separate ACK/NACK feedback for PDSCHs received from different TRPs, the UE should be able to generate separate ACK/NACK codebooks identified by an index, if the index is configured and applied across all CCs. The index to be used to generate separated ACK/NACK codebook is a higher layer signalling index per CORESET. Note that the index may not be configured for scenarios if there is no ambiguity of codebook generation at the UE, e.g. slot based PUCCH resource allocation per TRP. This does not preclude configuring the index for other purposes.

At least for eMBB with M-DCI NCJT in order to generate different PDSCH scrambling sequences, support enhancing RRC configuration to configure multiple dataScramblingIdentityPDSCH.

For rate matching mechanism used for multi-DCI based multi-TRP/panel transmission and for LTE CRS, extending lte-CRS-ToMatchAround to be configured with multiple CRS patterns in a serving cell.

NR Beam Management is discussed below.

Beam management in Release 15 of NR was designed for a situation where multiple beams cover one cell. Due to the smaller coverage area of these narrow beams, it could be anticipated that a UE would change beam more frequently than it changes cells. To reduce the signaling load for the beam switches, it was decided that RRC signaling would not be required to facilitate such changes. Instead, a signaling solution based on Medium Access Control protocol (MAC) Control Element (CE) or DCI has been introduced for beam management/intra-cell mobility. FIG. 1 illustrates beam switching within the same cell, with intra-cell beam management, and with no RRC signalling involved for the switching.

Three examples of sub-functionality to support beam management are L1-RSRP reporting on SSB and CSI-RS; MAC CE based activation/deactivation updates of beam indications, so-called Quasi-Co-Location (QCL) source, explained in the following in more details); and beam failure recovery/radio link monitoring/beam failure detection.

As these functionalities were designed to handle mobility without RRC involvement, they were limited to intra-cell operation. Following is a description of some existing fundamental concepts in the 5G NR L1 specifications that are relevant for the present disclosure, namely, beam indications, Quasi-Co-Location (QCL) source and TCI states.

Beam indications, Quasi-Co-Location (QCL) source and TCI states are discussed below.

Several signals can be transmitted from the same base station antenna from different antenna ports. These signals can have the same large-scale properties, for instance in terms of Doppler shift/spread, average delay spread, or average delay, when measured at the receiver. These antenna ports are then said to be quasi co-located (QCL).

The network can then signal to the UE that two antenna ports are QCL so that the UE interprets that signals from these will have some similar properties. If the UE knows that two antenna ports are QCL with respect to a certain parameter (e.g. Doppler spread), the UE can estimate that parameter based on a reference signal transmitted from one of the antenna ports and use that estimate when receiving another reference signal or physical channel from the other antenna port. Typically, the first antenna port is represented by a measurement reference signal such as a CSI-RS (known as source RS) and the second antenna port is a demodulation reference signal (DMRS) (known as target RS) for PDSCH or PDCCH reception.

For instance, if antenna ports A and B are QCL with respect to average delay, the UE can estimate the average delay from the signal received from antenna port A (known as the source reference signal (RS)) and assume that the signal received from antenna port B (target RS) has the same average delay. This is useful for demodulation since the UE can know beforehand the properties of the channel when trying to measure the channel utilizing the DMRS, which may help the UE in for instance selecting an appropriate channel estimation filter.

Information about what assumptions can be made regarding QCL is signaled to the UE from the network. In NR, four types of QCL relations between a transmitted source RS and transmitted target RS are defined:

Type A: {Doppler shift, Doppler spread, average delay, delay spread} have to receive it with a sufficiently good SINR. In many cases, this means that the TRS has to be transmitted in a suitable beam to a certain UE.

Together with the concept of QCL source is the concept of a transmission configuration information (TCI) state. Each of the M states in a list of TCI states can be interpreted as a list of M possible beams transmitted in the downlink from the network and/or a list of M possible TRPs used by the network to communicate with the UE. The M TCI states can also be interpreted as a combination of one or multiple beams transmitted from one or multiple TRPs.

Each TCI state contains the previously described QCL information, i.e. one or two source downlink reference signals (RS), where each source RS associated with a QCL type. For example, a TCI state contains a pair of reference signals, each associated with a QCL type, e.g. two different CSI-RSs {CSI-RS1, CSI-RS2} is configured in the TCI state as {qcl-Type1, qcl-Type2}={Type A, Type D}. It means the UE can derive Doppler shift, Doppler spread, average delay, delay spread from CSI-RS1 and Spatial Rx parameter (i.e. the RX beam to use) from CSI-RS2. In terms of RRC signaling, a TCI state is represented by an IE called TCI-State as shown in Table 1 below.

TABLE 1

TCI-State Information Element

```
-- ASN1START
-- TAG-TCI-STATE-START
TCI-State ::=           SEQUENCE {
    tci-StateId         TCI-StateId,
    qcl-Type1           QCL-Info,
    qcl-Type2           QCL-Info        OPTIONAL, -- Need R
    ...
}
QCL-Info ::=            SEQUENCE {
    cell                ServCellIndex   OPTIONAL,  -- Need R
    bwp-Id              BWP-Id          OPTIONAL, -- Cond CSI-RS-Indicated
    referenceSignal         CHOICE {
        csi-rs              NZP-CSI-RS-ResourceId,
        ssb                 SSB-Index
    },
    qcl-Type            ENUMERATED {typeA, typeB, typeC, typeD},
    ...
}
-- TAG-TCI-STATE-START
-- ASN1STOP
```

Type B: {Doppler shift, Doppler spread}
Type C: {average delay, Doppler shift}
Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. This is helpful for a UE that uses analog beamforming to receive signals, since the UE needs to adjust its RX beam in some direction prior to receiving a certain signal. If the UE knows that the signal is spatially QCL with some other signal it has received earlier, then it can safely use the same RX beam to receive also this signal. Note that for beam management, the discussion mostly revolves around QCL Type D, but it may also be necessary to convey a Type A QCL relation for the RSs to the UE, so that it can estimate all the relevant large-scale parameters.

Typically, this is achieved by configuring the UE with a CSI-RS for tracking (TRS) for time/frequency offset estimation. To be able to use any QCL reference, the UE would The TCI-State IE may be included in an RRC message transmitted to the UE, such as an RRCReconfiguration message.

As it is shown above in the TCI-State IE definition, there is a field called cell. According to the definition in TS 38.331 (Reference [5]), the field called cell in the QCL-Info configuration (i.e. cell field of IE ServCellIndex) is the UE's serving cell in which the Reference Signal that is QCL source is being configured. If the field is absent, it applies to the serving cell in which the TCI-State is configured (i.e. the spCell of the cell group, not an indexed SCell). The RS can be located on a serving cell other than the serving cell in which the TCI-State is configured only if the qcl-Type is configured as type D (see TS 38.214, Reference [8], section 5.1.5).

Existing approaches, however, may not adequately address configuration of radio link monitoring, radio resource management, and/or spatial relations.

SUMMARY

According to some embodiments of inventive concepts, a method of operating a network node is provided. A first information element IE is provided including an indication of an added synchronization signal block/physical cell identity SSB/PCI. The indication of the added SSB/PCI indicates an SSB and associated PCI that are associated with a radio link. A second IE is provided including the indication of the added SSB/PCI. The second IE relates to at least one of channel state information CSI, radio link monitoring RLM, uplink power control, and/or uplink spatial relations. A control message including the first IE and the second IE is transmitted to a user equipment UE, to enable the UE to perform a radio link monitoring function on the radio link.

According to some embodiments of inventive concepts, a method of operating a user equipment UE is provided. According to some embodiments of inventive concepts, a method of operating a user equipment UE is provided. A control message is received from a network node. The control message includes a first information element IE including an indication of an added synchronization signal block/physical cell identity SSB/PCI, and the control message includes a second IE including the indication of the added SSB/PCI. The indication of the added SSB/PCI indicates an SSB and associated PCI that are associated with a radio link, and the second IE relates to at least one of channel state information CSI, radio link monitoring RLM, uplink power control, and/or uplink spatial relations. A radio link monitoring function is performed on the radio link based on the indication of the added SSB/PCI.

According to some embodiments, related network nodes and user equipment may also be provided.

According to some embodiments, by providing the first and second IEs with the indication of the added SSB/PCI (where the second IE relates to at least one of CSI, RLM, UL power control, and/or UL spatial relations), improved support for inter-cell multi-TRP reception may be provided.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
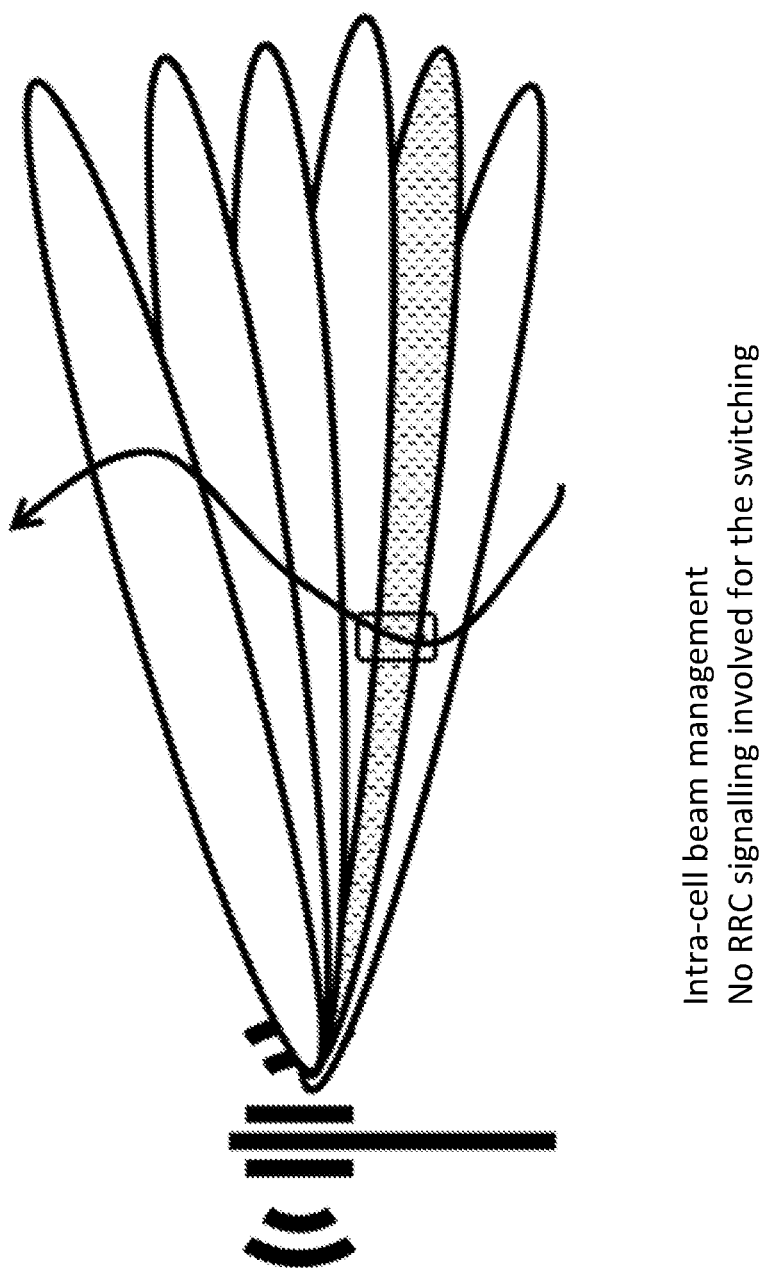
FIG. 1 illustrates intra-cell beam management in a New Radio NR system.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

It has been argued in R1-1902528 (Reference [4])—Lower-layer mobility enhancements that the only thing that is needed for the UE to be able to start receiving data on the physical layer in the target cell is that the QCL source is updated. This would enable the UE to align to the target cell in an indicated direction to demodulate the bits and decode the data.

The RRC IE that carries the QCL source is called TCI-state, as shown in Table 1.

The TCI-state IE contains pointers to reference signal(s). The reference signals are implicitly associated with a serving cell via a serving cell integer index. Hence, in Rel-15, it is only possible to change QCL source to reference signals transmitted within a serving cell (SpCell or associated SCell within that SpCell group). It is not possible to change the QCL source to a reference signal in a non-serving cell.

To be able to use this functionality, it has been proposed in R1-1902528—Lower-layer mobility enhancements to introduce an identifier of the non-serving cell in the QCL-info where as proposed, a natural choice for such an identifier is the physical cell identity (PCI).

If a PCI were introduced in the QCL-info, the network could update the QCL source to an RS in a non-serving cell. Once the indication command takes effect, the network can directly start transmitting data over PDSCH from the new cell. Since the procedure is synchronized, the network and the UE have the same understanding of when the updated configuration takes effect. Thus, the interruption in data communication can be eliminated.

However, there remains a problem as to how to configure functionality for the other TRPs, such as radio link monitoring, radio resource management, spatial relations, etc. One approach is to add a list of additional SSBs (including PCI) in ServingCellConfig and add a reference to one entry of that list in QCL-Info (only included when the reference is SSB). The ServingCellConfig IE is communicated to the UE by the network via an RRC message, such as RRCReconfiguration.

When QCL-Info is updated with PCI information, it essentially means that the SSB of which the PCI belongs to becomes signaled in serving cell configurations. Currently, each serving cell has one SSB(PCI) associated to it and CSI, radio link monitoring when configured separately, are based on the SSB(PCI) currently given in ServingCellConfigCommon.

If new SSB(PCI) are added to serving cell configuration, it is unclear how these will be used by the UE. For example, the UE might interpret the new SSB(PCI) as belonging to the serving cell rather than another TRP.

Some embodiments described herein provide a method for a UE to consider multiple sets of SSB, where each set has its independent PCI configured for the UE, in serving cell configuration. Some embodiments described herein provide details for the configuration of multiple sets of SSBs. Hence, under a serving cell, a unique SSB can be indicated by the pair {SSB index; PCI} in contrast to the approach in Rel-15 where only SSB index was used to address a unique SSB. For the UE to use the SSB(PCI), it is desirable for the added SSB(PCI) to be included in other IEs in the RRCReconfiguration message. For example, some embodiments may allow further features to be enabled, as discussed below.

CSI reporting related to transmission from a TRP that has another SSB(PCI) associated to it. In order to report L1-RSRP based on SSB of the added SSB(PCI), the added SSB(PCI) needs to be indicated to the UE in CSI-SSB-ResourceSet in CSI-MeasConfig.

Radio link monitoring (RLM) configuration from a TRP that has another SSB(PCI) associated to it.

Radio Resource Management (RRM) from a TRP in has another SSB(PCI) associated to it.

UL power control associated to a TRP in has another SSB(PCI) associated to it.

Spatial relations association to a TRP in has another SSB(PCI) associated to it.

Determining MAC CE format taking added SSB(PCI) into account.

According to some embodiments, it may be possible to support inter-cell multi-TRP reception.

For purposes of the following discussion, it is assumed the ServingCellConfig IE includes in one of its IEs the list of added SSB(PCI)s. The additional SSBs are referred to herein as "added SSB(PCI)" and it is assumed that each of these is identified by an ID.

In one embodiment, each item of the "added SSB(PCI)" includes one or more of: an identifier (referred here as "addedSSB_Id"), PCI, SSB measurement timing configuration (SMTC), subcarrier spacing (SCS) and Absolute Radio-Frequency Channel Number (ARFCN). The PCI of addedSSB_Id can be different from the PCI used for the serving cell. The ARFCN tells where the SSB is located in frequency.

In another embodiment, if SCS is not given, the UE may assume the SCS is the same as for the serving cell (both for SSB and PDSCH/PDCCH). In another embodiment, is SMTC is not given, the UE may assume the SMTC is the same as for the serving cell as given in ServingCellConfigCommon.

In one embodiment, the mTRP ID is associated to the added SSB(PCI).

Taking added SSB(PCI) into account in CSI is discussed below.

In one embodiment, the added SSB(PCI) may be taken into account in CSI. For example, in order to report L1-RSRP based on SSB of the added SSB(PCI), the added SSB(PCI) may be indicated to the UE in CSI-SSB-ResourceSet used in CSI-MeasConfig and in CSI-ReportConfig in some embodiments.

In some embodiments, the IE CSI-SSB-ResourceSet may be used to configure one SS/PBCH block resource set which refers to SS/PBCH as indicated in ServingCellConfigCommon. Alternatively, if "SSBPCI_mTRP" is configured, the SSB-Index refers to SS/PBCH in added SSB(PCI) given in ServingCellConfig as referred by "addedSSB_Id". The CSI-SSB-ResourceSet IE including addedSSB_Id is shown below in Table 2.

The IE CSI-SSB-ResourceSet is used to configure one SS/PBCH block resource set which refers to SS/PBCH as indicated in ServingCellConfigCommon. The CSI-SSB-ResourceSet information element is illustrated in Table 2 below.

TABLE 2

| CSI-SSB-ResourceSet information element |
|---|
| -- ASN1START |
| -- TAG-CSI-SSB-RESOURCESET-START |
| CSI-SSB-ResourceSet ::= SEQUENCE { |
|    csi-SSB-ResourceSetId   CSI-SSB-ResourceSetId, |
|    csi-SSB-ResourceList   SEQUENCE (SIZE(1..maxNrofCSI-SSB-ResourcePerSet)) OF SSB-Index, |
|    ... |
| [ |
| SSBPCI_mTRP     addedSSB_Id     OPTIONAL Need M |
| ] |
| } |
| -- TAG-CSI-SSB-RESOURCESET-STOP |
| -- ASN1STOP |

By including "addedSSB_Id" in the CSI-SSB-Resource-Set IE, the UE can, for example, report CSI associated with the identified SSB(PCI).

Taking added SSB(PCI) into account in RadioLinkMonitoringConfig is discussed below.

In another embodiment, the added SSB(PCI) may be taken into account in RadioLinkMonitoringConfig for use in radio link monitoring by the UE. For example, in order to report L1-RSRP based on SSB of the added SSB(PCI), the added SSB(PCI) may be indicated to the UE in CSI-SSB-ResourceSet used in CSI-MeasConfig and in CSI-ReportConfig. The RadioLinkMonitoringConfig IE with "addedSSB_Id" included is shown below in Table 3.

The IE RadioLinkMonitoringConfig is used to configure radio link monitoring for detection of beam- and/or cell radio link failure. See also TS 38.321 (Reference [9]), clause 5.1.1. The RadioLinkMonitoringConfig information element is illustrated in Table 3 below.

TABLE 3

RadioLinkMonitoringConfig information element

```
-- ASN1START
-- TAG-RADIOLINKMONITORINGCONFIG-START
RadioLinkMonitoringConfig ::=   SEQUENCE {
failureDetectionResourcesToAddModList SEQUENCE
(SIZE(1..maxNrofFailureDetectionResources)) OF RadioLinkMonitoringRS
OPTIONAL, -- Need N
failureDetectionResourcesToReleaseList SEQUENCE
(SIZE(1..maxNrofFailureDetectionResources)) OF RadioLinkMonitoringRS-Id
                                                   OPTIONAL, -- Need N
    beamFailureInstanceMaxCount         ENUMERATED {n1, n2, n3, n4, n5, n6, n8, n10}
OPTIONAL, -- Need R
    beamFailureDetectionTimer           ENUMERATED {pbfd1, pbfd2, pbfd3, pbfd4, pbfd5,
pbfd6, pbfd8, pbfd10} OPTIONAL, -- Need R
    ...
}
RadioLinkMonitoringRS ::=       SEQUENCE {
    radioLinkMonitoringRS-Id        RadioLinkMonitoringRS-Id,
    purpose                     ENUMERATED {beamFailure, rlf, both},
    detectionResource               CHOICE {
        ssb-Index               SSB-Index,
        csi-RS-Index                NZP-CSI-RS-ResourceId
    },
    ...
[
SSBPCI_mTRP                                        addedSSB_Id
                        OPTIONAL Need M
]
}
-- TAG-RADIOLINKMONITORINGCONFIG-STOP
-- ASN1STOP
```

Table 4 below provides RadioLinkMonitoringConfig field descriptions for fields of the RadioLinkMonitoringConfig information element.

TABLE 4

RadioLinkMonitoringConfig field descriptions beamFailureDetectionTimer
Timer for beam failure detection (see TS 38.321 [3], clause 5.17). See also the BeamFailureRecoveryConfig IE. Value in number of "$Q_{out,\ LR}$ reporting periods of Beam Failure Detection" Reference Signal (see TS 38.213 [13], clause 6). Value pbfd1 corresponds to 1 $Q_{out,\ LR}$ reporting period of Beam Failure Detection Reference Signal, value pbfd2 corresponds to 2 $Q_{out,\ LR}$ reporting periods of Beam Failure Detection Reference Signal and so on.
beamFailureInstanceMaxCount
This field determines after how many beam failure events the UE triggers beam failure recovery (see TS 38.321 [3], clause 5.17). Value n1 corresponds to 1 beam failure instance, value n2 corresponds to 2 beam failure instances and so on.
failureDetectionResourcesToAddModList
A list of reference signals for detecting beam failure and/or cell level radio link failure (RLF). The limits of the reference signals that the network can configure are specified in TS 38.213 [13], table 5-1. The network configures at most two detectionResources per BWP for the purpose beamFailure or both. If no RSs are provided for the purpose of beam failure detection, the UE performs beam monitoring based on the activated TCI-State for PDCCH as described in TS 38.213 [13], clause 6. If no RSs are provided in this list for the purpose of RLF detection, the UE performs Cell-RLM based on the activated TCI-State of PDCCH as described in TS 38.213 [13], clause 5. The network ensures that the UE has a suitable set of reference signals for performing cell-RLM.

TABLE 4-continued

RadioLinkMonitoringConfig field descriptions

SSBPCI_mTRP
"SSBPCI_mTRP" is configured, the SSB-Index refers to SS/PBCH in added SSB(PCI) given in ServingCellConfig as referred by "addedSSB_Id".

Table 5 below provides RadioLinkMonitoringRS field descriptions for fields of the RadioLinkMonitoringConfig information element

TABLE 5

RadioLinkMonitoringRS field descriptions detectionResource
A reference signal that the UE shall use for radio link monitoring or beam failure detection (depending on the indicated purpose).
purpose
Determines whether the UE shall monitor the associated reference signal for the purpose of cell- and/or beam failure detection.

By including "addedSSB_Id" in the RadioLinkMonitoringConfig, the UE can perform radio link monitoring on the added SSB(PCI).

Taking added SSB(PCI) into account in radio resource management (RRM) is discussed below.

In some embodiments, the added SSB(PCI) may be taken into account in radio resource management (RRM). For example, there may be a need for UE to take these added SSBs into account when measuring SSBs on a carrier.

In some embodiments, the UE may consider each SSB as a separate entity and derive cell quality for each SSB. In this case, in measurement object, these SSBs may be flagged as belonging to a TRP. In this case, when the UE reports, the UE may add the flag to the measurement result.

In another embodiment, the UE may be configured to combine the measurements from the two SSBs. Combining the measurements may include an average over the measurement quantity like RSRP or RSRQ, selection of the measurement quantity, reporting measurement quantity on both SSBs where second report may be relative to the first report.

Taking added SSB(PCI) into account UL power control is discussed below.

In other embodiments, the UE may take the added SSB (PCI) into account for UL power control. For example, in order to perform UL power control, the UE may be configured with a pathloss reference RS. In this case, the added SSB(PCI) may be indicated in the corresponding RRC configuration. An example of a PUCCH-PowerControl IE that takes the added SSB(PCI)) into account is shown below in Table 6.

The IE PUCCH-PowerControl is used to configure UE-specific parameters for the power control of PUCCH. The PUCCH-PowerControl information element is illustrated in Table 6 below.

TABLE 6

PUCCH-PowerControl information element

```
-- ASN1START
-- TAG-PUCCH-POWERCONTROL-START
PUCCH-PowerControl ::=      SEQUENCE {
    deltaF-PUCCH-f0         INTEGER (-16..15)    OPTIONAL, -- Need R
    deltaF-PUCCH-f1         INTEGER (-16..15)    OPTIONAL, -- Need R
    deltaF-PUCCH-f2         INTEGER (-16..15)    OPTIONAL, -- Need R
    deltaF-PUCCH-f3         INTEGER (-16..15)    OPTIONAL, -- Need R
    deltaF-PUCCH-f4         INTEGER (-16..15)    OPTIONAL, -- Need R
    p0-Set                  SEQUENCE (SIZE (1..maxNrofPUCCH-P0-PerSet)) OF P0-PUCCH       OPTIONAL, -- Need M
    pathlossReferenceRSs    SEQUENCE (SIZE (1..maxNrofPUCCH-PathlossReferenceRSs)) OF PUCCH-PathlossReferenceRS
                                                                    OPTIONAL, -- Need M
    twoPUCCH-PC-AdjustmentStates   ENUMERATED {twoStates}    OPTIONAL, -- Need S
    ...
}
P0-PUCCH ::=              SEQUENCE {
    p0-PUCCH-Id           P0-PUCCH-Id,
    p0-PUCCH-Value        INTEGER (-16..15)
}
P0-PUCCH-Id ::=           INTEGER (1..8)
PUCCH-PathlossReferenceRS ::=    SEQUENCE {
    pucch-PathlossReferenceRS-Id    PUCCH-PathlossReferenceRS-Id,
    referenceSignal                 CHOICE {
        ssb-Index                   SSB-Index,
        csi-RS-Index                NZP-CSI-RS-ResourceId
    }
[
SSBPCI_mTRP                         addedSSB_Id     OPTIONAL Need M
]
}
-- TAG-PUCCH-POWERCONTROL-STOP
-- ASN1STOP
```

Table 7 below provides P0-PUCCH field descriptions for fields of the PUCCH-PowerControl information element.

TABLE 7

P0-PUCCH field descriptions p0-PUCCH-Value
P0 value for PUCCH with 1 dB step size.

Table 8 below provides PUCCH-PowerControl field descriptions for fields of the PUCCH-PowerControl information element.

TABLE 8

PUCCH-PowerControl field descriptions deltaF-PUCCH-f0
deltaF for PUCCH format 0 with 1 dB step size (see TS 38.213 [13], clause 7.2).
deltaF-PUCCH-f1
deltaF for PUCCH format 1 with 1 dB step size (see TS 38.213 [13], clause 7.2).
deltaF-PUCCH-f2
deltaF for PUCCH format 2 with 1 dB step size (see TS 38.213 [13], clause 7.2).
deltaF-PUCCH-f3
deltaF for PUCCH format 3 with 1 dB step size (see TS 38.213 [13], clause 7.2).
deltaF-PUCCH-f4
deltaF for PUCCH format 4 with 1 dB step size (see TS 38.213 [13], clause 7.2).
p0-Set
A set with dedicated P0 values for PUCCH, i.e., {P01, P02, . . . } (see TS 38.213 [13], clause 7.2).
pathlossReferenceRSs
A set of Reference Signals (e.g. a CSI-RS config or a SS block) to be used for PUCCH pathloss estimation. Up to maxNrofPUCCH-PathlossReference-RSs may be configured. When the field is absent, the UE uses the SSB as reference signal (see TS 38.213 [13], clause 7.2).
twoPUCCH-PC-AdjustmentStates
Number of PUCCH power control adjustment states maintained by the UE (i.e., g(i)). If the field is present (n2) the UE maintains two power control states (i.e., g(i, 0) and g(i, 1)). If the field is absent, it maintains one power control state (i.e., g(i, 0)) (see TS 38.213 [13], clause 7.2).
SSBPCI_mTRP
"SSBPCI_mTRP" is configured, the SSB-Index refers to SS/PBCH in added SSB(PCI) given in ServingCellConfig as referred The example above related to PUCCH power control, and similar extensions should be made for SRS power control (in the field pathlossReferenceRS inside the RRC IE SRS-ResourceSet) and PUSCH power control (in the RRC IE PUSCH-PathlossReferenceRS).

Taking added SSB(PCI) into account UL spatial relations is discussed below.

In some embodiments, the added SSB(PCI) may be taken into account for UL spatial relations. For example, the UE can be configured to use a spatial relation to an RS in another cell. This means that the added SSB(PCI) may be indicated in the corresponding RRC configuration. The PUCCH-SpatialRelationInfo IE with "addedSSB_Id" is shown the table below.

The IE PUCCH-SpatialRelationInfo is used to configure the spatial setting for PUCCH transmission and the parameters for PUCCH power control, see TS 38.213, (Reference [7]), clause 9.2.2. The PUCCH-SpatialRelationInfo Information Element is illustrated in Table 9 below.

TABLE 9

PUCCH-SpatialRelationInfo IE

-- ASN1START
-- TAG-PUCCH-SPATIALRELATIONINFO-START
PUCCH-SpatialRelationInfo ::=    SEQUENCE {
  pucch-SpatialRelationInfoId    PUCCH-SpatialRelationInfoId,
  servingCellId        ServCellIndex            OPTIONAL, -- Need S
  referenceSignal      CHOICE {
    ssb-Index          SSB-Index,
    csi-RS-Index       NZP-CSI-RS-ResourceId,
    srs                SEQUENCE {
      resource         SRS-ResourceId,
      uplinkBWP        BWP-Id
    }
  },
  pucch-PathlossReferenceRS-Id    PUCCH-PathlossReferenceRS-Id,
  p0-PUCCH-Id          P0-PUCCH-Id,
  closedLoopIndex      ENUMERATED { i0, i1 }
[
SSBPCI_mTRP                  addedSSB_Id       OPTIONAL Need M
]

TABLE 9-continued

PUCCH-SpatialRelationInfo IE

}
PUCCH-SpatialRelationInfoId ::= INTEGER (1..maxNrofSpatialRelationInfos)
-- TAG-PUCCH-SPATIALRELATIONINFO-STOP
-- ASN1STOP Table 10 below provides PUCCH-SpatialRelationInfo field descriptions for fields of the PUCCH-SpatialRelation-Info Information Element.

TABLE 10

PUCCH-SpatialRelationInfo field descriptions servingCellId
If the field is absent, the UE applies the ServCellId of the serving cell in which this PUCCH-SpatialRelationInfo is configured
SSBPCI_mTRP
"SSBPCI_mTRP" is configured, the SSB-Index refers to SS/PBCH in added SSB(PCI) given in ServingCellConfig as referred The spatial relation must be updated also for SRS, in the RRC IE SRS-SpatialRelationInfo.

Taking added SSB(PCI) into account determining MAC CE format is discussed below.

In some embodiments, the added SSB(PCI) may be taken into account for determining a MAC CE format. Adding SSB(PCI) to MAC CEs will create double the number of MAC CEs. Since each MAC CE requires an LCID, this may be an expensive solution. It may be better to reuse the existing LCID. Accordingly, some embodiments introduce an additional format for each MAC CE which includes the SSB(PCI) field. When the UE determines the format of the MAC CE, it will perform the following operations:

1. Compare the LCID of the MAC subPDU to a list of LCIDs (Table 6.2.1-1 of 38.321, Reference [9])
2. Upon determining it is a MAC CE which may have multiple formats, use an RRC parameter to determine which of the formats the MAC CE has.

In one embodiment this parameter is the SSB(PCI) parameter and the presence of the parameter indicates that the UE determines the MAC CE format to be a format which includes the SSB(PCI) field.

In one embodiment this parameter is the SSB(PCI) parameter and the presence of the parameter indicates that the UE determines the MAC CE format to be a format different from existing formats not taking into account SSB(PCI)

In another embodiment the UE can use the SSB(PCI) configured over RRC to determine the MAC CE format. If the UE is configured with the SSB(PCI) it determines the MAC CE format to be a MAC CE format which includes an SSB(PCI) field. If the UE is not configured with the SSB (PCI) field it determines the MAC CE format to be a MAC CE format without the SSB(PCI) field.

In yet another embodiment, instead of explicit SSB(PCI) field, there is another SSB(PCI) related way of interpreting the MAC CE.

Figure 2:
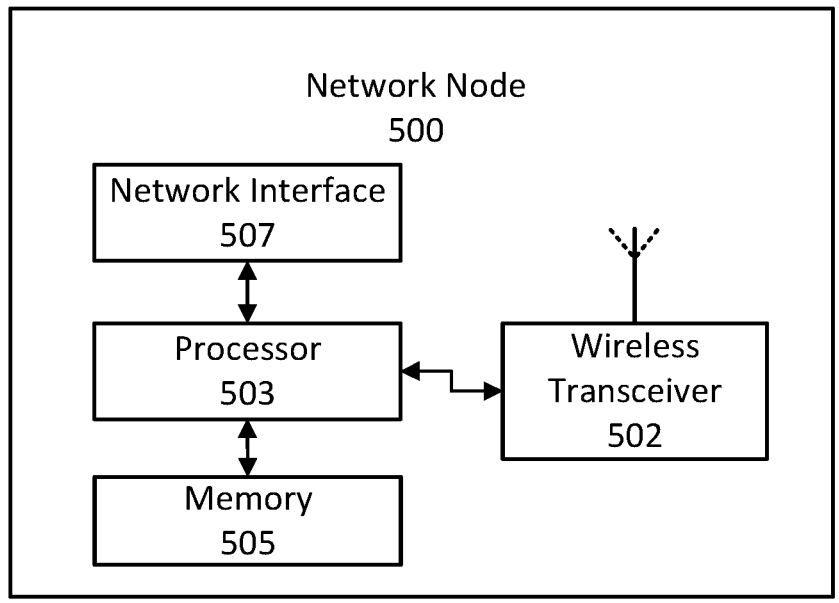
FIG. 2 is a block diagram illustrating a network node according to some embodiments of the inventive concepts.

FIG. 2 is a block diagram illustrating elements of a network node 500 of a communication system. The network node 500 may implement a RAN node in the communication system. For example, the network node 500 may implement a gNodeB or eNodeB.

As shown, the network node may include a network interface circuit 507 (also referred to as a network interface) configured to provide communications with other nodes (e.g., with other base stations, RAN nodes and/or core network nodes) of the communication network. The network node 500 may also include a wireless transceiver circuit 502 for providing a wireless communication interface with UEs. The network node 500 may also include a processor circuit 503 (also referred to as a processor) coupled to the transceiver circuit 502 and the network interface 507, and a memory circuit 505 (also referred to as memory) coupled to the processor circuit. The memory circuit 505 may include computer readable program code that when executed by the processor circuit 503 causes the processor circuit to perform operations according to embodiments disclosed herein. According to other embodiments, processor circuit 503 may be defined to include memory so that a separate memory circuit is not required.

As discussed herein, operations of the network node may be performed by processor 503, the wireless transceiver circuit 502 and/or the network interface 507. For example, the processor 503 may control the network interface 507 to transmit communications through network interface 507 to one or more other network nodes and/or to receive communications through network interface from one or more other network nodes. Moreover, modules may be stored in memory 505, and these modules may provide instructions so that when instructions of a module are executed by processor 503, processor 503 performs respective operations (e.g., operations discussed herein with respect to Example Embodiments).

Figure 3:
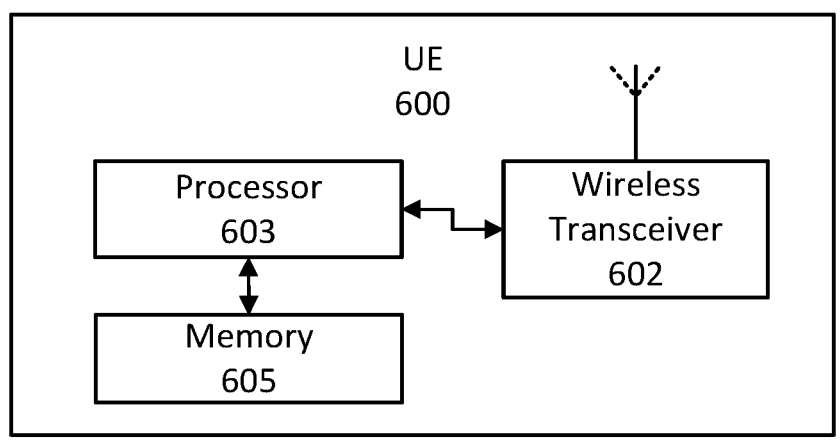
FIG. 3 is a block diagram illustrating a user equipment node according to some embodiments of the inventive concepts.

FIG. 3 is a block diagram illustrating elements of a UE 600 of a communication system. As shown, the UE may include a wireless transceiver circuit 602 for providing a wireless communication interface with a network. The UE 600 may also include a processor circuit 603 (also referred to as a processor) coupled to the transceiver circuit 602 and the wireless transceiver circuit 602, and a memory circuit 605 (also referred to as memory) coupled to the processor circuit. The memory circuit 605 may include computer readable program code that when executed by the processor circuit 603 causes the processor circuit to perform operations according to embodiments disclosed herein. According to other embodiments, processor circuit 603 may be defined to include memory so that a separate memory circuit is not required.

As discussed herein, operations of the UE may be performed by processor 603 and/or the wireless transceiver circuit 602. For example, the processor 603 may control the wireless transceiver circuit 602 to transmit communications to a network node 500. Moreover, modules may be stored in memory 605, and these modules may provide instructions so that when instructions of a module are executed by processor 603, processor 603 performs respective operations (e.g., operations discussed herein with respect to Example Embodiments).

Figure 4:
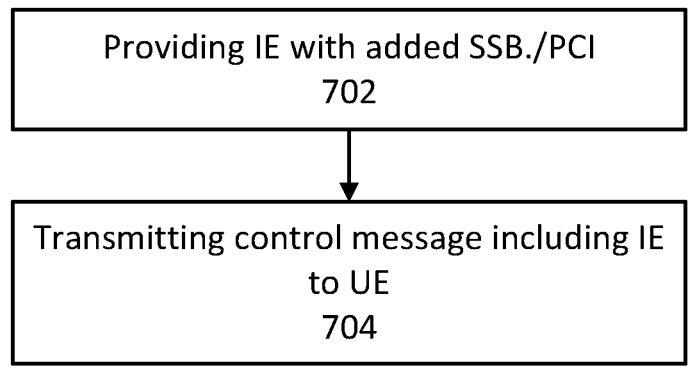
FIGS. 4, 6, and 7 are flowcharts that illustrate operations of a network node according to some embodiments.

Referring to FIG. 4, a method of operating a network node includes providing (702) a first information element, IE, including an indication of an added synchronization signal block/physical cell identity, SSB/PCI, wherein the added SSB/PCI indicates an SSB and associated PCI that are associated with a radio link; and transmitting (704) a control message including the first IE to a user equipment, UE, to enable the UE to perform a radio link monitoring function on the radio link.

The first information element may be a serving cell configuration IE. The control message may include a radio resource control, RRC, message. The RRC message may include an RRCReconfiguration message.

The added SSB/PCI may be associated with a transmit/receive point, TRP, other than a serving cell.

The added SSB/PCI may include one or more of an identifier of the added SSB/PCI, a physical cell identity, an SSB measurement timing configuration, SMTC, a subcarrier spacing, SCS, and an Absolute Radio-Frequency Channel Number, ARFCN.

The added SSB/PCI may identify a PCI that is different from a PCI used for a serving cell.

The method may further include including the added SSB/PCI in a second IE relating to channel state information, CSI; and including the second IE in the message to enable the UE to perform CSI measurements on the radio link. The second IE may include a CSI-MeasConfig IE. The second IE may include a CSI-SSB-ResourceSet IE.

The method may further include including the added SSB/PCI in a third IE relating to radio link monitoring; and including the third IE in the message to enable the UE to perform radio link monitoring on the radio link. The third IE may include a RadioLinkMonitoringConfig IE.

The method may further include including the added SSB/PCI in a fourth IE relating to uplink power control; and including the fourth IE in the message to enable the UE to perform uplink power control on the radio link. The fourth IE may include a PUCCH-PowerControl IE.

The method may further include including the added SSB/PCI in a fifth IE relating to uplink spatial relations; and including the fifth IE in the message to enable the UE to configure spatial relations on the radio link. The fifth IE may include a PUCCH-SpatialRelationInfo IE.

The method may further include including the added SSB/PCI in a medium access control, MAC, control element, CE; and including the MAC CE in the message to enable the UE to determine a MAC CE format of the radio link. The MAC CE may include an SSB/PCI field.

Referring to FIGS. 2 and 4, a network node (500) according to some embodiments is configured to perform operations of providing (702) a first information element, IE, including an indication of an added synchronization signal block/physical cell identity, SSB/PCI, wherein the added SSB/PCI indicates an SSB and associated PCI that are associated with a radio link; and transmitting (704) a control message including the first IE to a user equipment, UE, to enable the UE to perform a radio link monitoring function on the radio link.

Referring to FIGS. 2 and 4, a network node (500) according to some embodiments includes a processing circuit (503), a transceiver (502) coupled to the processing circuit, and a memory (505) coupled to the processing circuit. The memory includes computer-readable program instructions that, when executed by the processing circuit, cause the processing circuit to perform operations of providing (702) a first information element, IE, including an indication of an added synchronization signal block/physical cell identity, SSB/PCI, wherein the added SSB/PCI indicates an SSB and associated PCI that are associated with a radio link; and transmitting (704) a control message including the first IE to a user equipment, UE, to enable the UE to perform a radio link monitoring function on the radio link.

Figure 5:
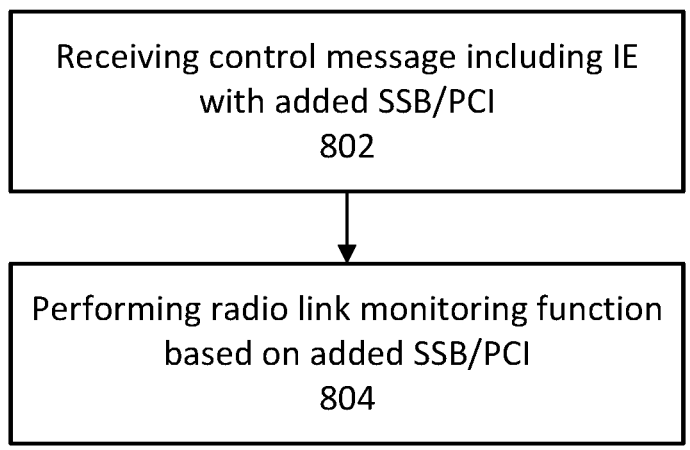
FIGS. 5, 8A-E, and 9A-E are flowcharts that illustrate operations of a network node according to some embodiments.

Referring to FIG. 5, a method of operating a user equipment includes receiving (802) a control message from a network node, the message including a first information element, IE, including an indication of an added synchronization signal block/physical cell identity, SSB/PCI, wherein the added SSB/PCI indicates an SSB and associated PCI that are associated with a radio link; and performing (804) a radio link monitoring function on the radio link based on the added SSB/PCI.

The first information element may be a serving cell configuration IE. The control message may include a radio resource control, RRC, message. The RRC message may include an RRCReconfiguration message.

The added SSB/PCI may be associated with a transmit/receive point, TRP, other than a serving cell.

The added SSB/PCI may include one or more of an identifier of the added SSB/PCI, a physical cell identity, an SSB measurement timing configuration, SMTC, a subcarrier spacing, SCS, and an Absolute Radio-Frequency Channel Number, ARFCN.

The added SSB/PCI may identify a PCI that is different from a PCI used for a serving cell.

The method may further include receiving a second IE in the control message relating to channel state information, CSI, the second IE identifying the added SSB/PCI; and performing a CSI measurement on the radio link based on the added SSB/PCI. The second IE may include a CSI-MeasConfig IE. The second IE may include a CSI-SSB-ResourceSet IE.

The method may further include receiving a third IE relating to radio link monitoring, the third IE identifying the added SSB/PCI; and performing radio link monitoring on the radio link based on the added SSB/PCI. The third IE may include a RadioLinkMonitoringConfig IE.

The method may further include receiving a fourth IE relating to uplink power control, the fourth IE identifying the added SSB/PCI; and performing uplink power control on the radio link based on the added SSB/PCI. The fourth IE may include a PUCCH-PowerControl IE.

The method may further include receiving a fifth IE relating to uplink spatial relations, the fifth IE identifying the added SSB/PCI; and configuring spatial relations on the radio link based on the added SSB/PCI. The fifth IE may include a PUCCH-SpatialRelationInfo IE.

The method may further include receiving a medium access control, MAC, control element, CE, the MAC CE identifying the added SSB/PCI; and determining a MAC CE format based on the added SSB/PCI. The MAC CE may include an SSB/PCI field.

Referring to FIGS. 3 and 5, a UE (600) according to some embodiments is configured to perform operations of receiving (802) a control message from a network node, the message including a first information element, IE, including an indication of an added synchronization signal block/physical cell identity, SSB/PCI, wherein the added SSB/PCI indicates an SSB and associated PCI that are associated with a radio link; and performing (804) a radio link monitoring function on the radio link based on the added SSB/PCI.

Referring to FIGS. 3 and 5, a UE (600) according to some embodiments includes a processing circuit (603), a transceiver (602) coupled to the processing circuit, and a memory (605) coupled to the processing circuit. The memory includes computer-readable program instructions that, when executed by the processing circuit, cause the processing circuit to perform operations of receiving (802) a control message from a network node, the message including a first information element, IE, including an indication of an added synchronization signal block/physical cell identity, SSB/PCI, wherein the added SSB/PCI indicates an SSB and associated PCI that are associated with a radio link; and performing (804) a radio link monitoring function on the radio link based on the added SSB/PCI.

Operations of a network node 500 (implemented using the structure of FIG. 2, which may be implemented as a RAN node) will now be discussed with reference to the flow chart of FIG. 6 according to some embodiments of inventive concepts. For example, modules may be stored in memory 505 of FIG. 2, and these modules may provide instructions so that when the instructions of a module are executed by respective RAN node processing circuitry 503, processing circuitry 503 performs respective operations of the flow chart.

According to some embodiments at block 902, processing circuit 503 provides a first information element IE including an indication of an added synchronization signal block/physical cell identity SSB/PCI wherein the indication of the added SSB/PCI indicates an SSB and associated PCI that are associated with a radio link. According to some embodiments, the first information element may be a serving cell configuration IE. According to some embodiments, the indication of the added SSB/PCI may include one or more of an identifier of the added SSB/PCI, a physical cell identity PCI, an SSB measurement timing configuration SMTC, a subcarrier spacing SCS, and an Absolute Radio-Frequency Channel Number ARFCN. For example, the indication of the added SSB/PCI may identify a PCI that is different from a PCI used for a serving cell.

According to some embodiments at block 904, processing circuit 503 provides a second IE including the indication of the added SSB/PCI, wherein the second IE relates to at least one of channel state information CSI, radio link monitoring, uplink power control, and/or uplink spatial relations.

According to some embodiments at block 906, processing circuit 503 transmits (through transceiver circuit 502) a control message including the first IE and the second IE to a user equipment UE to enable the UE to perform a radio link monitoring function on the radio link. For example, the second IE may be included in the control message to at least one of enable the UE to perform CSI measurements on the radio link, enable the UE to perform radio link monitoring on the radio link, enable the UE to perform uplink power control on the radio link, and/or enable the UE to configure spatial relations on the radio link.

According to some embodiments, the second IE may relate to channel state information CSI, and the second IE may be included in the control message to enable the UE to perform CSI measurements on the radio link. For example, the second IE may be a CSI-MeasConfig IE, or the second IE may be a CSI-SSB-ResourceSet IE.

According to some embodiments, the second IE may relate to radio link monitoring, and the second IE may be included in the control message to enable the UE to perform radio link monitoring on the radio link. For example, the second IE may be a RadioLinkMonitoringConfig IE.

According to some embodiments, the second IE may relate to uplink power control, and the second IE may be included in the control message to enable the UE to perform uplink power control on the radio link. For example, the second IE may be a PUCCH-PowerControl IE.

According to some embodiments, the second IE may relate to uplink spatial relations, and the second IE may be included in the control message to enable the UE to configure spatial relations on the radio link. For example, the second IE may be a PUCCH-SpatialRelationInfo IE.

Figure 6:
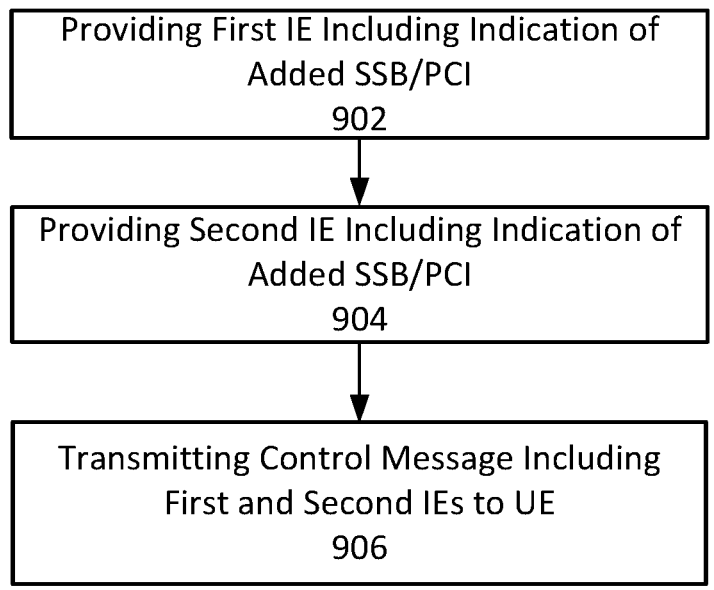

Various operations from the flow chart of FIG. 6 may be optional with respect to some embodiments of network nodes and related methods.

Operations of a network node 500 (implemented using the structure of FIG. 2, which may be implemented as a RAN node) will now be discussed with reference to the flow chart of FIG. 7 according to some embodiments of inventive concepts. For example, modules may be stored in memory 505 of FIG. 2, and these modules may provide instructions so that when the instructions of a module are executed by respective network node processing circuitry 503, processing circuitry 503 performs respective operations of the flow chart.

According to some embodiments at block 1002, processing circuit 503 provides a first information element IE including an indication of an added synchronization signal block/physical cell identity SSB/PCI wherein the indication of the added SSB/PCI indicates an SSB and associated PCI that are associated with a radio link. According to some embodiments, the first information element may be a serving cell configuration IE. According to some embodiments, the indication of the added SSB/PCI may include one or more of an identifier of the added SSB/PCI, a physical cell identity PCI, an SSB measurement timing configuration SMTC, a subcarrier spacing SCS, and an Absolute Radio-Frequency Channel Number ARFCN. For example, the indication of the added SSB/PCI may identify a PCI that is different from a PCI used for a serving cell.

According to some embodiments at block 1004, processing circuit 503 provides a second IE including the indication of the added SSB/PCI, wherein the second IE relates to at least one of channel state information CSI, radio link monitoring, uplink power control, and/or uplink spatial relations.

According to some embodiments at block 1008, processing circuit 503 transmits (through transceiver circuit 502) a control message including the first IE and the second IE to a user equipment UE to enable the UE to perform a radio link monitoring function on the radio link. For example, the second IE may be included in the control message to at least one of enable the UE to perform CSI measurements on the radio link, enable the UE to perform radio link monitoring on the radio link, enable the UE to perform uplink power control on the radio link, and/or enable the UE to configure spatial relations on the radio link.

According to some embodiments, the second IE may relate to channel state information CSI, and the second IE may be included in the control message to enable the UE to perform CSI measurements on the radio link. For example, the second IE may be a CSI-MeasConfig IE, or the second IE may be a CSI-SSB-ResourceSet IE.

According to some embodiments, the second IE may relate to radio link monitoring, and the second IE may be included in the control message to enable the UE to perform radio link monitoring on the radio link. For example, the second IE may be a RadioLinkMonitoringConfig IE.

According to some embodiments, the second IE may relate to uplink power control, and the second IE may be included in the control message to enable the UE to perform uplink power control on the radio link. For example, the second IE may be a PUCCH-PowerControl IE.

According to some embodiments, the second IE may relate to uplink spatial relations, and the second IE may be included in the control message to enable the UE to configure spatial relations on the radio link. For example, the second IE may be a PUCCH-SpatialRelationInfo IE.

According to some embodiments at block 1010, processing circuit 503 provides a media access control MAC control element CE including the indication of the added SSB/PCI. In such embodiments, the MAC CE may be included in a MAC control message to enable the UE to determine a MAC CE format of the radio link.

Figure 7:
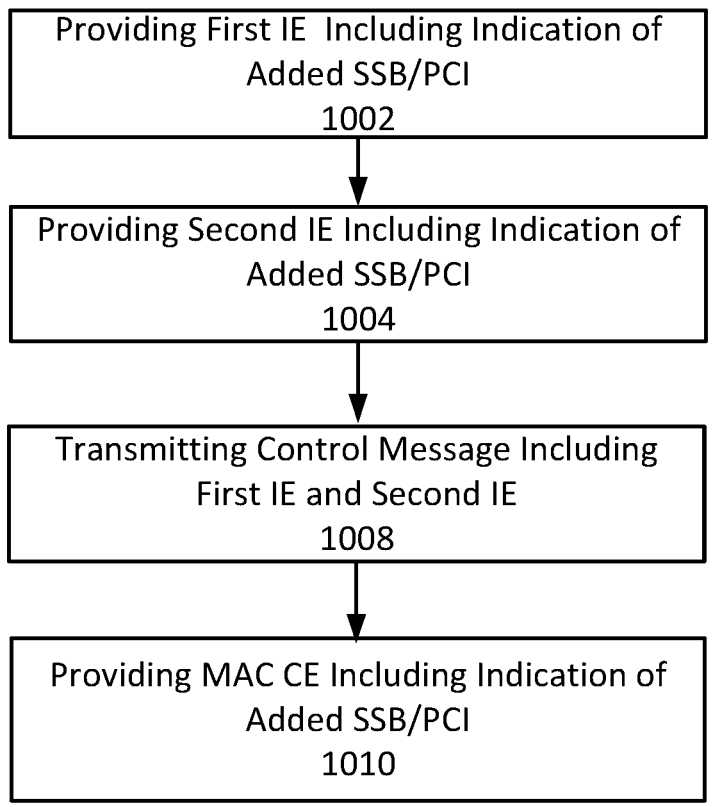
Figure 8A:
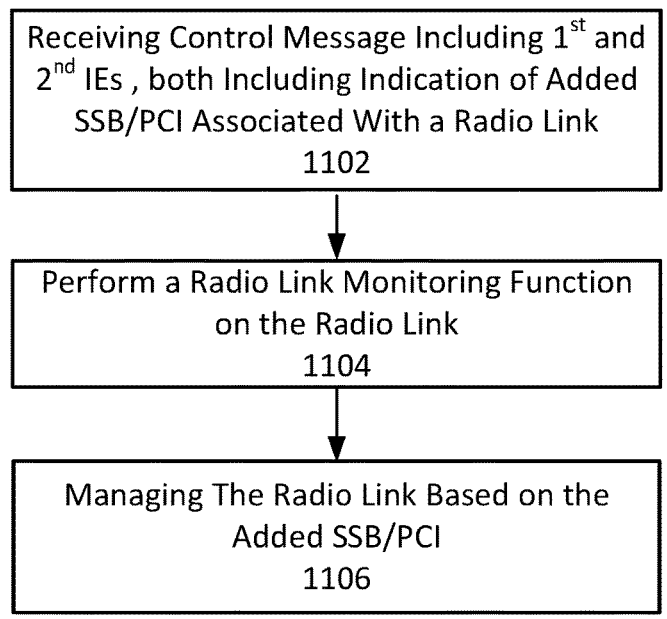
Figure 8B:
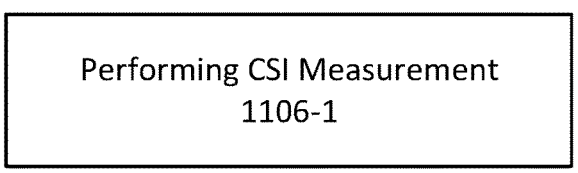
Figure 8D:
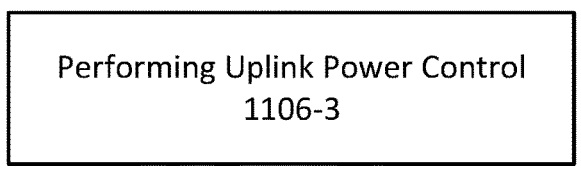
Figure 8C:
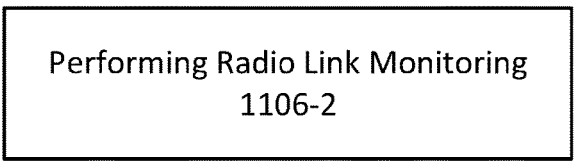
Figure 8E:
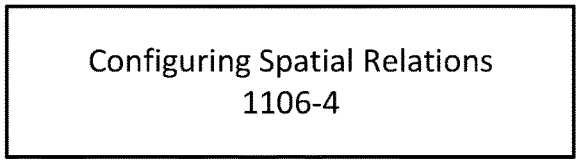
Figures 9A, 9B, 9C, 9D, 9E:
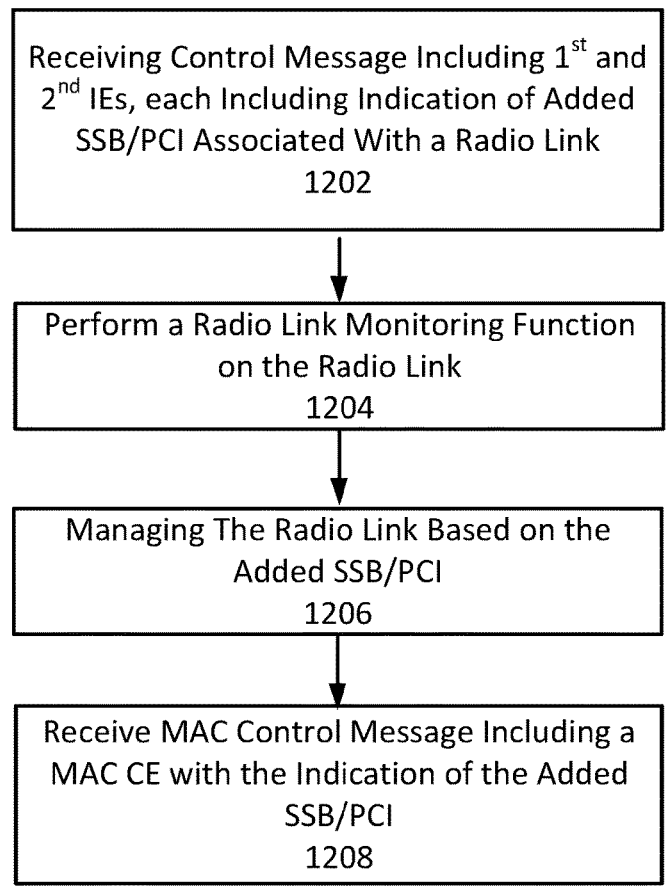

Various operations from the flow chart of FIG. 7 may be optional with respect to some embodiments of network nodes and related methods. Regarding methods of example embodiment 1 (set forth below), for example, operations of block 1010 of FIG. 7 may be optional.

Operations of the communication device 600 (implemented using the structure of the block diagram of FIG. 3) will now be discussed with reference to the flow charts of FIGS. 8A to 8E according to some embodiments of inventive concepts. For example, modules may be stored in memory 605 of FIG. 3, and these modules may provide instructions so that when the instructions of a module are executed by respective communication device processing circuitry 603, processing circuitry 603 performs respective operations of the flow chart.

According to some embodiments at block 1102, processor circuit 603 receives (through transceiver circuit 602) a control message from a network node. The control message includes a first information element IE including an indication of an added synchronization signal block/physical cell identity SSB/PCI, and the control message includes a second IE including the indication of the added SSB/PCI. The indication of the added SSB/PCI indicates an SSB and associated PCI that are associated with a radio link, and the second IE relates to at least one of channel state information CSI, radio link monitoring, uplink power control, and/or uplink spatial relations.

According to some embodiments, the first information element may be a serving cell configuration IE.

According to some embodiments, the indication of the added SSB/PCI includes one or more of an identifier of the added SSB/PCI, a physical cell identity, an SSB measurement timing configuration, SMTC, a subcarrier spacing, SCS, and an Absolute Radio-Frequency Channel Number, ARFCN. For example, the indication of the added SSB/PCI may identify a PCI that is different from a PCI used for a serving cell.

According to some embodiments at block 1104, processor circuit 603 performs a radio link monitoring function on the radio link based on the indication of the added SSB/PCI.

According to some embodiments at block 1106, processor circuit 603 manages the radio link based on the added SSB/PCI. Operations of block 1106 may be performed, for example, as discussed below with respect to operation 1106-1 of FIG. 8B, operation 1106-2 of FIG. 8C, operation 1106-3 of FIG. 8D, and/or operation 1106-4 of FIG. 8E.

According to some embodiment, the second IE in the control message relates to channel state information CSI. In such embodiments at block 1106-1 of FIG. 8B, processor circuit 603 may perform a CSI measurement on the radio link based on the indication of the added SSB/PCI. For example, the second IE may be a CSI-MeasConfig IE, and/or the second IE may be a CSI-SSB-ResourceSet IE.

According to some embodiments, the second IE may relate to radio link monitoring. In such embodiments at block 1106-2 of FIG. 8C, processor circuit 603 may perform radio link monitoring on the radio link based on the indication of the added SSB/PCI. For example, the second IE may be a RadioLinkMonitoringConfig IE.

According to some embodiments, the second IE may relate to uplink power control. In such embodiments at block 1106-3 of FIG. 8D, processor circuit 603 may perform uplink power control on the radio link based on the indication of the added SSB/PCI. For example, the second IE may be a PUCCH-PowerControl IE.

According to some embodiments, the second IE may relate to uplink spatial relations. In such embodiments at block 1106-4 of FIG. 8E, processor circuit 603 may configure spatial relations on the radio link based on the indication of the added SSB/PCI. For example, the second IE may be a PUCCH-SpatialRelationInfo IE.

Various operations from the flow charts of FIGS. 8A to 8E may be optional with respect to some embodiments of communication devices and related methods. Regarding methods of example embodiment 16 (set forth below), for example, operations of blocks 1106, 1106-1, 1106-2, 1106-3, and/or 1106-4 of FIGS. 8A, 8B, 8C, 8D, and/or 8E may be optional.

Operations of the communication device 600 (implemented using the structure of the block diagram of FIG. 3) will now be discussed with reference to the flow charts of FIGS. 9A to 9E according to some embodiments of inventive concepts. For example, modules may be stored in memory 605 of FIG. 3, and these modules may provide instructions so that when the instructions of a module are executed by respective communication device processing circuitry 603, processing circuitry 603 performs respective operations of the flow chart.

According to some embodiments at block 1202, processor circuit 603 receives (through transceiver circuit 602) a control message from a network node. The control message includes a first information element IE including an indication of an added synchronization signal block/physical cell identity SSB/PCI, and the control message includes a second IE including the indication of the added SSB/PCI. The indication of the added SSB/PCI indicates an SSB and associated PCI that are associated with a radio link, and the second IE relates to at least one of channel state information CSI, radio link monitoring, uplink power control, and/or uplink spatial relations.

According to some embodiments, the first information element may be a serving cell configuration IE.

According to some embodiments, the indication of the added SSB/PCI includes one or more of an identifier of the added SSB/PCI, a physical cell identity, an SSB measurement timing configuration, SMTC, a subcarrier spacing, SCS, and an Absolute Radio-Frequency Channel Number, ARFCN. For example, the indication of the added SSB/PCI may identify a PCI that is different from a PCI used for a serving cell.

According to some embodiments at block 1204, processor circuit 603 performs a radio link monitoring function on the radio link based on the indication of the added SSB/PCI.

According to some embodiments at block 1206, processor circuit 603 manages the radio link based on the added SSB/PCI. Operations of block 1206 may be performed, for example, as discussed below with respect to operation 1206-1 of FIG. 9B, operation 1206-2 of FIG. 9C, operation 1206-3 of FIG. 9D, and/or operation 1206-4 of FIG. 9E.

According to some embodiment, the second IE in the control message relates to channel state information CSI. In such embodiments at block 1206-1 of FIG. 9B, processor circuit 603 may perform a CSI measurement on the radio link based on the indication of the added SSB/PCI. For example, the second IE may be a CSI-MeasConfig IE, and/or the second IE may be a CSI-SSB-ResourceSet IE.

According to some embodiments, the second IE may relate to radio link monitoring. In such embodiments at block 1206-2 of FIG. 9C, processor circuit 603 may perform radio link monitoring on the radio link based on the indication of the added SSB/PCI. For example, the second IE may be a RadioLinkMonitoringConfig IE.

According to some embodiments, the second IE may relate to uplink power control. In such embodiments at block 1206-3 of FIG. 9D, processor circuit 603 may perform uplink power control on the radio link based on the indication of the added SSB/PCI. For example, the second IE may be a PUCCH-PowerControl IE.

According to some embodiments, the second IE may relate to uplink spatial relations. In such embodiments at block 1206-4, of FIG. 9E processor circuit 603 may configure spatial relations on the radio link based on the indication of the added SSB/PCI. For example, the second IE may be a PUCCH-SpatialRelationInfo IE.

According to some embodiments at block 1208, processor circuit 603 receives (through transceiver circuit 602) a MAC control message including a medium access control MAC control element CE, with the MAC CE including the indication of the added SSB/PCI.

Various operations from the flow charts of FIGS. 9A to 9E may be optional with respect to some embodiments of communication devices and related methods. Regarding methods of example embodiment 16 (set forth below), for example, operations of blocks 1206, 1208, 1206-1, 1206-2, 1206-3, and/or 1206-4 of FIGS. 9A, 9B, 9C, 9D, and/or 9E may be optional.

Example Embodiments are set forth below.

Embodiment 1. A method of operating a network node, comprising: providing (702) a first information element, IE, including an indication of an added synchronization signal block/physical cell identity, SSB/PCI, wherein the added SSB/PCI indicates an SSB and associated PCI that are associated with a radio link; and transmitting (704) a control message including the first IE to a user equipment, UE, to enable the UE to perform a radio link monitoring function on the radio link.

Embodiment 2. The method of Embodiment 1, wherein the first information element is a serving cell configuration IE.

Embodiment 3. The method of any previous Embodiment, wherein the control message comprises a radio resource control, RRC, message.

Embodiment 4. The method of any previous Embodiment, wherein the RRC message comprises an RRCReconfiguration message.

Embodiment 5. The method of any previous Embodiment, wherein the added SSB/PCI is associated with a transmit/receive point, TRP, other than a serving cell.

Embodiment 6. The method of any previous Embodiment, wherein the added SSB/PCI includes one or more of an identifier of the added SSB/PCI, a physical cell identity, an SSB measurement timing configuration, SMTC, a subcarrier spacing, SCS, and an Absolute Radio-Frequency Channel Number, ARFCN.

Embodiment 7. The method of Embodiment 6, wherein the added SSB/PCI identifies a PCI that is different from a PCI used for a serving cell.

Embodiment 8. The method of any previous Embodiment, further comprising: including the added SSB/PCI in a second IE relating to channel state information, CSI; and including the second IE in the message to enable the UE to perform CSI measurements on the radio link.

Embodiment 9. The method of Embodiment 8, wherein the second IE comprises a CSI-MeasConfig IE.

Embodiment 10. The method of Embodiment 8, wherein the second IE comprises a CSI-SSB-ResourceSet IE.

Embodiment 11. The method of any previous Embodiment, further comprising: including the added SSB/PCI in a third IE relating to radio link monitoring; and including the third IE in the message to enable the UE to perform radio link monitoring on the radio link.

Embodiment 12. The method of Embodiment 11, wherein the third IE comprises a RadioLinkMonitoringConfig IE.

Embodiment 13. The method of any previous Embodiment, further comprising: including the added SSB/PCI in a fourth IE relating to uplink power control; and including the fourth IE in the message to enable the UE to perform uplink power control on the radio link.

Embodiment 14. The method of Embodiment 13, wherein the fourth IE comprises a PUCCH-PowerControl IE.

Embodiment 15. The method of any previous Embodiment, further comprising: including the added SSB/PCI in a fifth IE relating to uplink spatial relations; and including the fifth IE in the message to enable the UE to configure spatial relations on the radio link.

Embodiment 16. The method of Embodiment 15, wherein the fifth IE comprises a PUCCH-SpatialRelationInfo IE.

Embodiment 17. The method of any previous Embodiment, further comprising: including the added SSB/PCI in a medium access control, MAC, control element, CE; and including the MAC CE in the message to enable the UE to determine a MAC CE format of the radio link.

Embodiment 18. The method of Embodiment 17, wherein including the added SSB/PCI in the MAC CE comprises including an SSB/PCI field in the MAC CE.

Embodiment 19. A network node (500) configured to perform operations according to any of Embodiments 1 to 18.

Embodiment 20. A network node (500), comprising: a processing circuit (503); a transceiver (502) coupled to the processing circuit; and a memory (505) coupled to the processing circuit, wherein the memory comprises computer readable program instructions that, when executed by the processing circuit, cause the UE to perform operations according to any of Embodiments 1 to 18.

Embodiment 21. A method of operating a user equipment, comprising: receiving (802) a control message from a network node, the message including a first information element, IE, including an indication of an added synchronization signal block/physical cell identity, SSB/PCI, wherein the added SSB/PCI indicates an SSB and associated PCI that are associated with a radio link; and performing (804) a radio link monitoring function on the radio link based on the added SSB/PCI.

Embodiment 22. The method of Embodiment 21, wherein the first information element is a serving cell configuration IE.

Embodiment 23. The method of Embodiment 21 or 22, wherein the control message comprises a radio resource control, RRC, message.

Embodiment 24. The method of any of Embodiments 21 to 23, wherein the RRC message comprises an RRCReconfiguration message.

Embodiment 25. The method of any of Embodiments 21 to 24, wherein the added SSB/PCI is associated with a transmit/receive point, TRP, other than a serving cell.

Embodiment 26. The method of any of Embodiments 21 to 25, wherein the added SSB/PCI includes one or more of an identifier of the added SSB/PCI, a physical cell identity, an SSB measurement timing configuration, SMTC, a sub-carrier spacing, SCS, and an Absolute Radio-Frequency Channel Number, ARFCN.

Embodiment 27. The method of Embodiment 26, wherein the added SSB/PCI identifies a PCI that is different from a PCI used for a serving cell.

Embodiment 28. The method of any of Embodiments 21 to 27, further comprising: receiving a second IE in the control message relating to channel state information, CSI, the second IE identifying the added SSB/PCI; and performing a CSI measurement on the radio link based on the added SSB/PCI.

Embodiment 29. The method of Embodiment 28, wherein the second IE comprises a CSI-MeasConfig IE.

Embodiment 30. The method of Embodiment 28, wherein the second IE comprises a CSI-SSB-ResourceSet IE.

Embodiment 31. The method of any of Embodiments 21 to 30, further comprising: receiving a third IE relating to radio link monitoring, the third IE identifying the added SSB/PCI; and performing radio link monitoring on the radio link based on the added SSB/PCI.

Embodiment 32. The method of Embodiment 31, wherein the third IE comprises a RadioLinkMonitoringConfig IE.

Embodiment 33. The method of any of Embodiments 21 to 32, further comprising: receiving a fourth IE relating to uplink power control, the fourth IE identifying the added SSB/PCI; and performing uplink power control on the radio link based on the added SSB/PCI.

Embodiment 34. The method of Embodiment 33, wherein the fourth IE comprises a PUCCH-PowerControl IE.

Embodiment 35. The method of any of Embodiments 21 to 34, further comprising: receiving a fifth IE relating to uplink spatial relations, the fifth IE identifying the added SSB/PCI; and configuring spatial relations on the radio link based on the added SSB/PCI.

Embodiment 36. The method of Embodiment 35, wherein the fifth IE comprises a PUCCH-SpatialRelationInfo IE.

Embodiment 37. The method of any of Embodiments 21 to 36, further comprising: receiving a medium access control, MAC, control element, CE, the MAC CE identifying the added SSB/PCI; and determining a MAC CE format based on the added SSB/PCI.

Embodiment 38. The method of Embodiment 37 wherein the MAC CE comprises an SSB/PCI field.

Embodiment 39. A use equipment (600) configured to perform operations according to any of Embodiments 21 to 38.

Embodiment 40. A user equipment (600), comprising: a processing circuit (603); a transceiver (602) coupled to the processing circuit; and a memory (605) coupled to the processing circuit, wherein the memory comprises computer readable program instructions that, when executed by the processing circuit, cause the UE to perform operations according to any of Embodiments 21 to 38.

Explanations are provided below for abbreviations that are mentioned in the present disclosure.

| Abbreviation | Explanation |
| --- | --- |
| 5GC | 5G Core Network |
| 5GS | 5G System |
| AMF | Access and Mobility Management Function |
| DC | Dual Connectivity |
| eNB | E-UTRAN NodeB |
| EN-DC | E-UTRA-NR Dual Connectivity |
| E-UTRA | Evolved Universal Mobile Terrestrial Radio Access |
| E-UTRAN | Evolved Universal Mobile Terrestrial Radio Access Network |
| EPC | Evolved Packet Core |
| EPS | Evolved Packet System |
| HO | Handover |
| LTE | Long Term Evolution |
| MME | Mobility Management Entity |
| MN | Master Node |
| MR | Multi-RAT |
| MR-DC | Multi-RAT Dual Connectivity |
| NG | Next Generation |
| NR | New Radio |
| P-GW | Packet Gateway |
| RAN | Radio Access Network |
| RAT | Radio Access Technology |
| RRC | Radio Resource Control |
| SMF | Session Management Function |
| S-GW | Serving GateWay |
| S-MN | Source MN |
| SN | Secondary Node |
| S-SN | Source SN |
| T-MN | Target MN |
| UE | User Equipment |
| UPF | User Plane Function |
| CU | Control Unit |
| DU | Distributed Unit |
| LLS | Lower-layer Split |
| MT | Mobile Termination |
| RLC | Radio Link Control |
| BAP | Backhaul Adaptation Protocol |
| BH | Backhaul |
| NDS | Network Domain Security |
| DTLS | Datagram Transport Layer Security |
| CP | Control Plane |
| UP | User Plane |
| UPF | User Plane Function |
| IAB | Integrated Access and Backhaul |
| gNB | gNodeB |
| MDT | Minimization of Drive Testing |
| NG-RAN | node: either a gNB or an ng-eNB. |
| eNB | E-UTRAN Node B |
| RAN | node: an eNB or NG-RAN node (either a gNB or an ng-eNB). |
| SCG | Secondary Cell group |
| SN | Slave Node |
| MCG | Master cell group |
| MN | Master Node |
| GNSS | Global Navigation Satellite System |
| AMF | Access Management Function |
| HSS | Home Subscriber Server |
| gNB | Next Generation Node-B |
| UP | User Plane |
| RAN | Radio Access Network |

Citations are provided below for references that are mentioned in the present disclosure.

[1] R1-1903697, LS on support of Enhancements on multi-TRP/panel transmission, 3GPP TSG RAN WG1 Meeting #96, Athens, Greece, 25 Feb.-1 Mar. 2019

[2] R1-1907966, LS on MIMO enhancement for NR, 3GPP TSG RAN WG1 Meeting #97, Reno, USA, 13-17 May 2019

[3] R1-1907870, LS on MAC CE design for SCell BFR, 3GPP TSG-RAN WG1 Meeting #97, Reno, USA, 13-17 May 2019

[4] R1-1902528, Lower-layer mobility enhancements, 3GPP TSG-RAN WG1 Meeting #96, Athens, Greece, Feb. 25-Mar. 1, 2019

[5] 3GPP TS 38.331 v15.7.0 (September 2019), Technical Specification Group Radio Access Network; NR; Radio Resource Control (RRC) protocol specification (Release 15)

[6] RP-182067, Revised WID: Enhancements on MIMO for NR, 3GPP TSG RAN Meeting #81, Gold Coast, Australia, Sep. 10-13, 2018

[7] 3GPP TS 38.213 v15.7.0 (September 2019), Technical Specification Group Radio Access Network; NR; Physical layer procedures for control (Release 15)

[8] 3GPP TS 38.214 v15.7.0 (September 2019), Technical Specification Group Radio Access Network; NR; Physical layer procedures for data (Release 15)

[9] 3GPP TS 38.321 v15.7.0 (September 2019), Technical Specification Group Radio Access Network; NR; Medium Access Control (MAC) protocol specification (Release 15)

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments, the claims, and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 10:
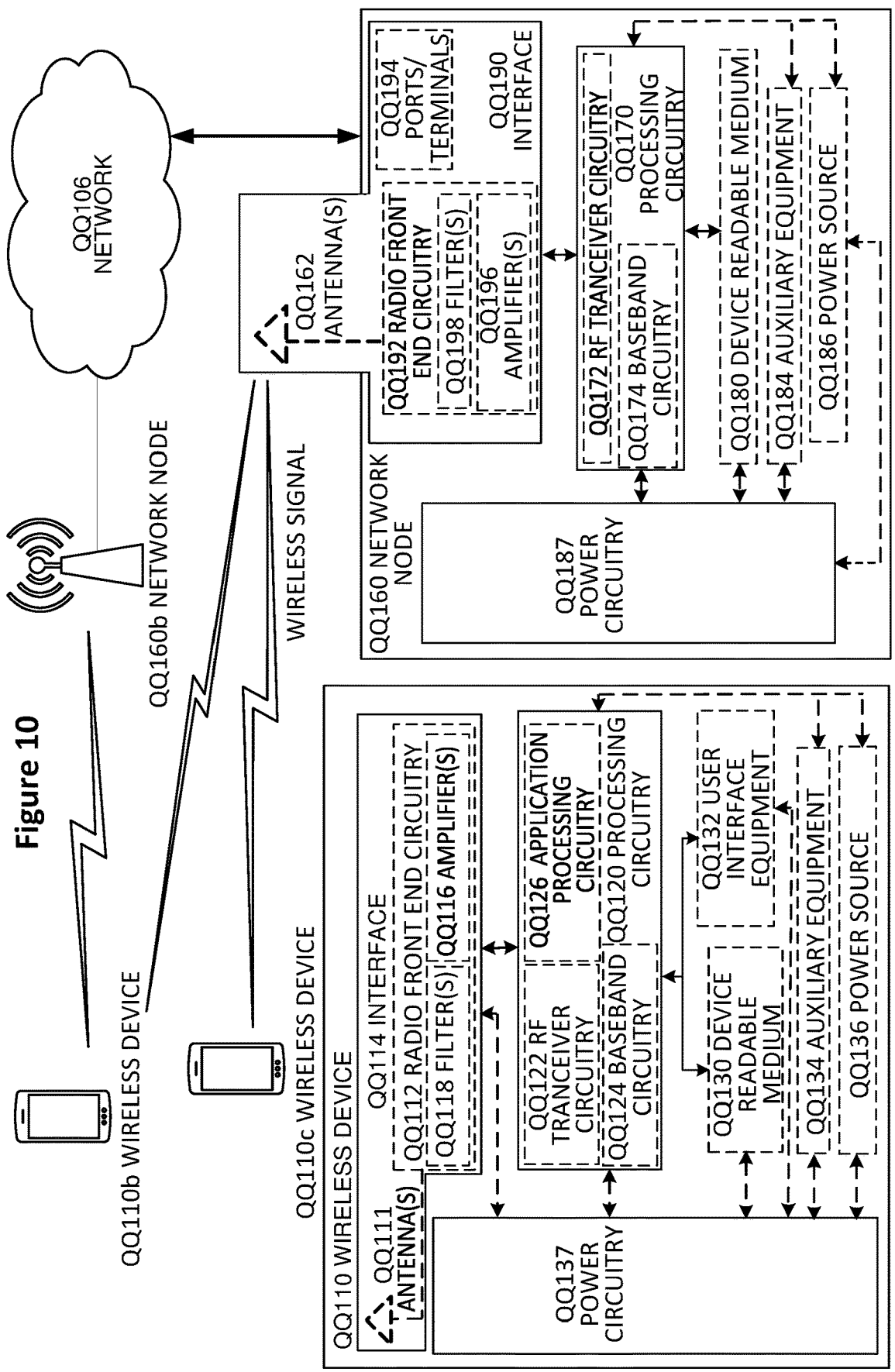
FIG. 10 is a block diagram of a wireless network according to some embodiments.

FIG. 10: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 10 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/ or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a user equipment, comprising:
receiving a control message from a network node, the control message including a first information element (IE) including an indication of an added synchronization signal block/physical cell identity (SSB/PCI) and the control message including a second IE including the indication of the added SSB/PCI, wherein the indication of the added SSB/PCI indicates an SSB and associated PCI that are associated with a radio link, and wherein the second IE relates to at least one of channel state information (CSI) radio link monitoring, uplink power control, and/or uplink spatial relations;
performing a radio link monitoring function on the radio link based on the indication of the added SSB/PCI; and
performing uplink power control on the radio link based on the indication of the added SSB/PCI.

2. The method of claim 1, wherein the first information element comprises a serving cell configuration IE.

3. The method of claim 1, wherein the indication of the added SSB/PCI includes one or more of an identifier of the added SSB/PCI, a physical cell identity, a SSB measurement timing configuration (SMTC), a subcarrier spacing (SCS), and an Absolute Radio-Frequency Channel Number (AFRCN).

4. The method of claim 3, wherein the indication of the added SSB/PCI identifies a PCI that is different from a PCI used for a serving cell.

5. The method of claim 1, wherein the second IE in the control message relates to channel state information (CSI) the method further comprising:
performing a CSI measurement on the radio link based on the indication of the added SSB/PCI.

6. The method of claim 5, wherein the second IE comprises a CSI-MeasConfig IE.

7. The method of claim 5, wherein the second IE comprises a CSI-SSB-ResourceSet IE.

8. The method of claim 1, wherein the second IE relates to radio link monitoring, the method further comprising:
performing radio link monitoring on the radio link based on the indication of the added SSB/PCI.

9. The method of claim 8, wherein the second IE comprises a RadioLinkMonitoringConfig IE.

10. The method of claim 1, wherein the second IE comprises a PUCCH-PowerControl IE.

11. The method of claim 1, wherein the second IE relates to uplink spatial relations, the method further comprising:
configuring spatial relations on the radio link based on the indication of the added SSB/PCI.

12. The method of claim 11, wherein the second IE comprises a PUCCH-SpatialRelationInfo IE.

13. The method of claim 1, wherein a MAC control message includes a medium access control (MAC) control element (CE), and the MAC CE including the indication of the added SSB/PCI.

14. The method of claim 1, further comprising at least one of:
performing a CSI measurement on the radio link based on the indication of the added SSB/PCI;
performing radio link monitoring on the radio link based on the indication of the added SSB/PCI; and/or
configuring spatial relations on the radio link based on the indication of the added SSB/PCI.

15. A user equipment, comprising:
a processing circuit;
a transceiver-coupled to the processing circuit; and
a memory coupled to the processing circuit, wherein the memory comprises computer readable program instructions that, when executed by the processing circuit, cause the UE to:
receive a control message from a network node, the control message including a first information element (IE) including an indication of an added synchronization signal block/physical cell identity (SSB/PCI) and the control message including a second IE including the indication of the added SSB/PCI, wherein the indication of the added SSB/PCI indicates an SSB and associated PCI that are associated with a radio link, and wherein the second IE relates to at least one of channel state information (CSI) radio link monitoring, uplink power control, and/or uplink spatial relations,
perform a radio link monitoring function on the radio link based on the indication of the added SSB/PCI; and
perform uplink power control on the radio link based on the indication of the added SSB/PCI.

16. The user equipment of claim 15, wherein the first information element comprises a serving cell configuration IE.

17. The user equipment of claim 15, wherein the second IE comprises a CSI-SSB-ResourceSet IE.

18. The user equipment of claim 15, wherein the second IE comprises a PUCCH-SpatialRelationInfo IE.

19. A non-transitory computer readable medium having stored thereon machine-readable instructions executable to cause a user equipment (UE) to perform operations comprising:
receiving a control message from a network node, the control message including a first information element (IE) including an indication of an added synchronization signal block/physical cell identity (SSB/PCI) and the control message including a second IE including the indication of the added SSB/PCI, wherein the indication of the added SSB/PCI indicates an SSB and associated PCI that are associated with a radio link, and wherein the second IE relates to at least one of channel state information (CSI) radio link monitoring, uplink power control, and/or uplink spatial relations;
performing a radio link monitoring function on the radio link based on the indication of the added SSB/PCI; and
performing uplink power control on the radio link based on the indication of the added SSB/PCI.

* * * * *